United States Patent [19]

Szewczyk

[11] 4,363,246
[45] Dec. 14, 1982

[54] MULTI WORM-RACK APPARATUS

[75] Inventor: Richard S. Szewczyk, Rochester, N.Y.

[73] Assignee: USM Corporation, Farmington, Conn.

[21] Appl. No.: 186,611

[22] Filed: Sep. 12, 1980

[51] Int. Cl.³ .................. F16H 29/20; F16H 35/06
[52] U.S. Cl. .................. 74/89.14; 74/383; 74/395
[58] Field of Search .......... 74/89.14, 424.5, 424.6, 74/424.7, 425, 427, 383, 395, 396, 398, 410

[56] References Cited

U.S. PATENT DOCUMENTS

| | | | |
|---|---|---|---|
| 479,390 | 7/1892 | Calcutt | 74/424.6 |
| 714,732 | 12/1902 | McColloch | 74/424.7 |
| 2,157,263 | 5/1939 | Johnson | 74/89.14 |
| 2,574,657 | 11/1951 | Pierce | 74/424.6 |

FOREIGN PATENT DOCUMENTS

| | | | |
|---|---|---|---|
| 416536 | 10/1910 | France | 74/398 |
| 279243 | 10/1929 | United Kingdom | 74/398 |

Primary Examiner—Lawrence J. Staab
Attorney, Agent, or Firm—Vincent A. White

[57] ABSTRACT

A carriage drive system for a metal working machine wherein the carriage supports the metal working tool. The carriage drive comprises a worm gear rotatably engaged with a rack arrangement, driven by a motor and gear box on the carriage. The rack arrangement comprises a pair of rack sections opposed to one another along the sides of the worm gear. The carriage drive is pivotably supported on the carriage by a pivot pin which permits slight rocking and self centering motion in the carriage drive as it propels the carriage on its ways.

2 Claims, 2 Drawing Figures

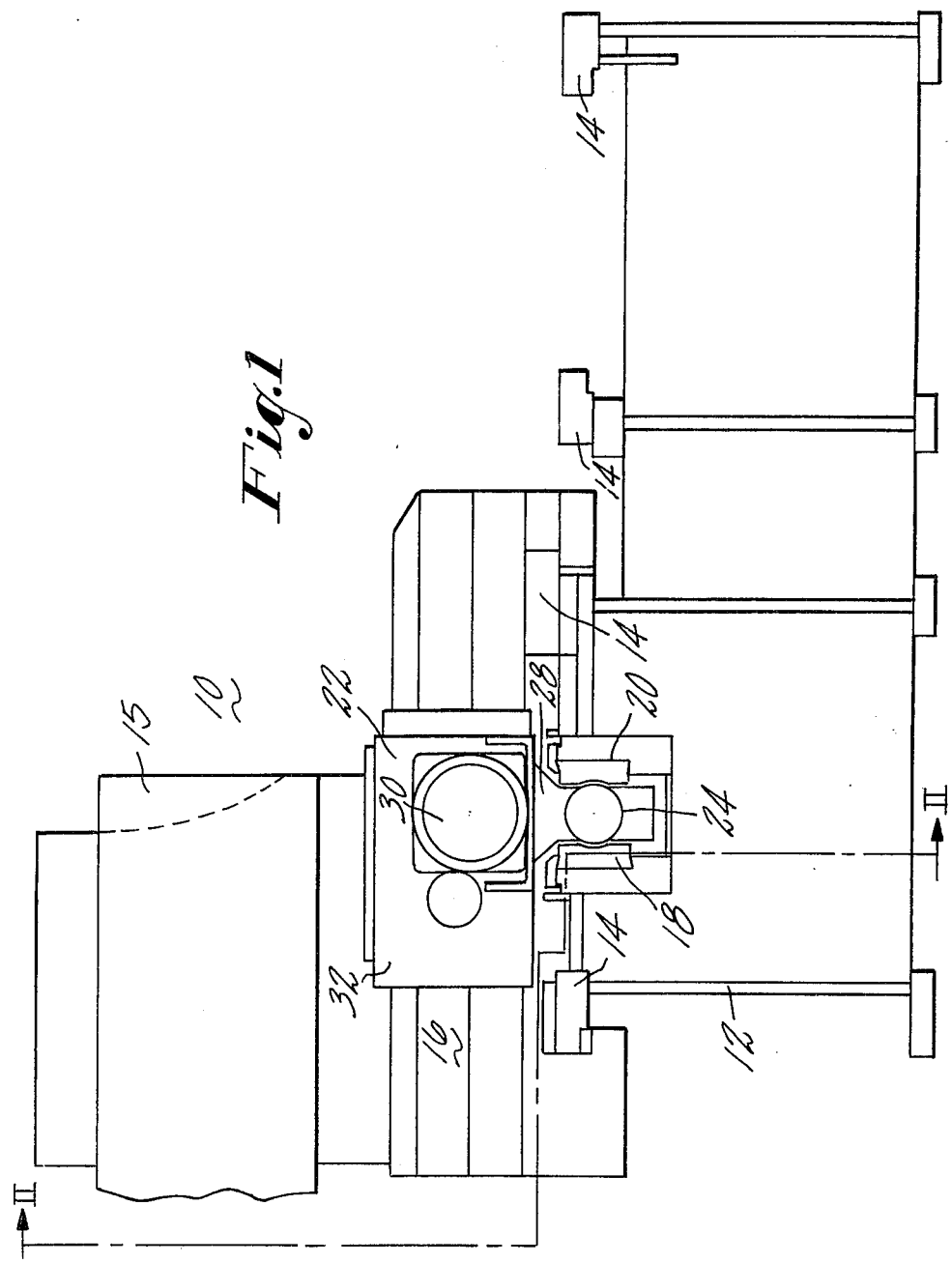

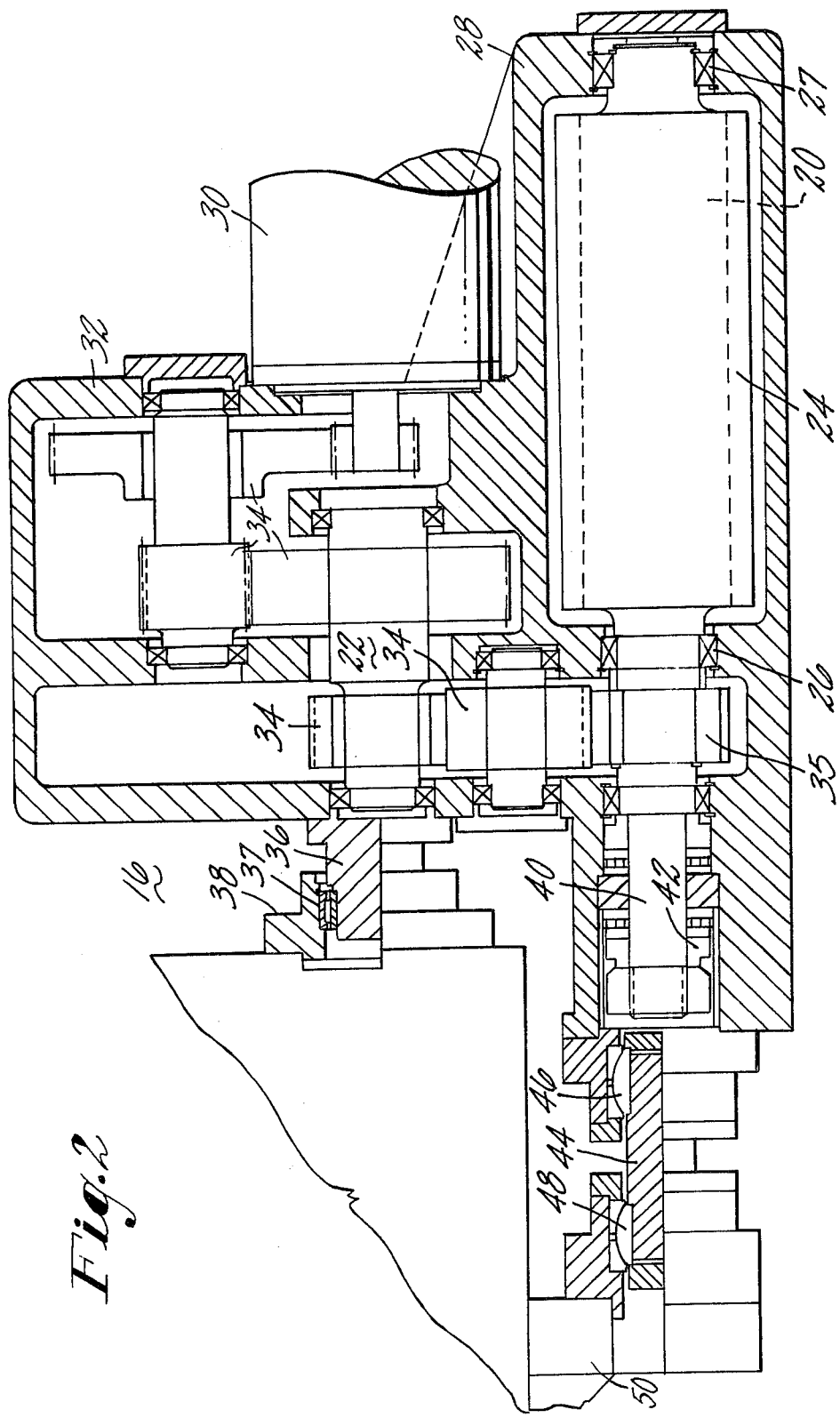

MULTI WORM-RACK APPARATUS

BACKGROUND OF THE INVENTION (1) Field of the Invention

This invention relates to a worm drive apparatus, and more particularly to metal working machines utilizing worm screw and worm rack mechanisms to provide precise component movement within those machines.

(2) Prior Art

Worm drive mechanisms have been used in gear units to move machinery components for many years. It is an effective method for transmitting rotary motion to linear motion. The axes of the worm gears and rack are however, spaced apart, and between them define a moment arm which may cause a slight non-linear arrangement in the worm, thereby creating extraneous forces, diminishing the efficiency that would otherwise be useful to move the components.

A typical worm and rack arrangement is shown in the machine tool art in U.S. Pat. No. 3,097,568 to Kampmeier, wherein a worm is disposed alongside and meshes with the teeth of a horizontal rack bolted to a ram. Rotation of the worm forces the rack and ram in a linear path.

This type of mechanism is also shown in U.S. Pat. No. 3,659,474 to Neugebauer, wherein a pair of worm gears are adapted to a single worm rack, the worm rack being attached to a table which is used to support a workpiece during its milling operation. The single worm rack on one side of the worm, as shown in the prior art, generates a radial component of force within the worm gear as a result of its thrust against a single rack. This radial component of force is a moment arm which causes deflection within the worm gear, and may cause undesirable loads on the machine carriage and its associated bearings. This bending force, in addition to the axial thrust through the worm created by the interaction of the worm gear shape on a single rack, effectuates the loading and deflection thereof and otherwise necessitates heavier components, bearings, motors and the like. The drive mechanism of the prior art also induces strain within itself, because slight deviations in the worm rack or worm gear are transmitted into their support systems which do not allow deflections therewith.

It is an object of the present invention to provide a worm drive mechanism that permits reduced component dimensions while still effecting the same work load.

It is a further object of the present invention to provide a worm drive mechanism which has a self-centering feature that eliminates the need for multibolting of the drive mechanism to the carriage.

It is yet a further object of the present invention to provide a worm drive mechanism which may be pivotably supported on its carriage, to facilitate its self-centering features.

BRIEF SUMMARY OF THE INVENTION

The present invention comprises a carriage drive system for a machine tool wherein a worm gear rotates between a pair of worm racks, mounted 180° apart, one on either side of the worm gear. The worm gear and its associated transmission and motor are mounted on the movable carriage, through a pivotal connection. The worm gear is rotatively journalled in an arrangement of thrust bearings, which thrust bearings are adapted to the carriage, providing a force therethrough, through a universal joint. The worm gear and its drive mechanism are thus permitted a slight free-swinging movement about their support at the pivotal connection. This slight free-swinging capability between several worm racks permits the worm gear to center itself between the opposed pair of worm racks when slight deviations are present therein, eliminating strain in the support systems and subsequent misalignment in the machining operation.

BRIEF DESCRIPTION OF THE DRAWINGS

The objects and advantages of the present invention will become more apparent when viewed in conjunction with the following drawings, in which:

FIG. 1 is an end view of a carriage drive system, and

FIG. 2 is a side elevational view of the carriage drive system, with portions thereof removed for clarity.

DESCRIPTION OF THE PREFERRED EMBODIMENTS

Referring now to the drawings in detail, and particularly to FIG. 1, there is shown a machine 10 comprising a base or bed 12 having a solid frame to support an arrangement of ways 14. The ways 14 slidably support a movable carriage 16. A workpiece, not shown, may be disposed alongside and generally parallel to the ways 14. The carriage 16 may move parallel to the ways 14 and has a portion 15 which may move transversely with respect to the workpiece, carrying any necessary tools thereagainst. An outer worm rack 18 and an inner worm rack 20 are arranged to oppose one another in a parallel fashion, secured to the bed 12, as shown in FIG. 1. The carriage 16, on top of the bed 12, has a carriage drive 22 arranged therewith. The carriage drive 22, includes a worm gear 24, which is longitudinally engaged between and slightly swingable transversely with respect to the outer and inner worm racks 18 and 20, which are disposed 180° apart, across from one another on the worm gear 24. The worm gear 24 is journalled at a first end and a second end thereof, by a pair of bearings 26 and 27 disposed in a frame 28 of the carriage drive 22, as shown in FIG. 2. A servo motor 30 is connectively linked to the worm gear 24 through a servo gear box 32, wherein a plurality of intermeshing gears 34 journalled in the servo gear box 32 effectuates the transfer of rotary motion from the servo motor 30 to a spur gear 35 journalled on the first end of the worm gear 24.

The carriage drive 22 is pivotably supported on the carriage 16 by a pivot pin 36 rigidly extending from the servo gear box 32 and which pivot pin 36 is journalled in a bearing 37 in a collar 38 fixed to the frame of the carriage 16. The first end of the worm gear 24, is associated with an axial restraint assembly 40. The axial restraint assembly 40 includes a thrust bearing arrangement 42 and a rigid link 44 having a first and a second universal joint and bushing 46 and 48 arranged on each end thereof. The second bushing 48 is attached to a bracket 50 on the main carriage 16.

In operation of the machine 10, the servo motor 30 is actuated through a proper source, not shown, to induce rotary motion through the servo gear box 32 and into the worm gear 24. Rotation in either direction of the worm gear 24 about its longitudinal axis effectuates linear motion of the carriage 16 with respect to the ways 14 of the machine 10. The outer and inner worm racks 18 and 20, as shown in FIG. 1, being 180° apart and separated from one another, permits the worm gear 24 to swing slightly with the rest of the carriage drive 22 about the pivot pin 36 to center itself as it rotates and drives itself therebetween. The self centering effect of the worm gear 24 is necessary to overcome slight deviations from linearity in either the outer or the inner worm racks 18 or 20. This self-centering feature is permitted because the carriage drive 22 is swingably supported on the main carriage 16 by the pivot pin 36 journalled in the collar 38. Another pivot arrangement may be axially arranged with respect to the pivot pin 36 to provide balance to the drive 22 and full support therewith. The thrust generated between the rotating worm gear 24 and the outer and inner worm racks 18 or 20 is transmitted to the main carriage 16 by the axial restraint assembly 40, which itself facilitates the "free-swinging" motion of the carriage drive 22 with respect to the main carriage 16 by the effect of the universal joints 46 and 48 arranged therebetween, which transmits axial thrust only, while it permits alignment of the worm gear 24 between the inner and outer racks 18 and 20. The axial restraint assembly 40 may pass the thrust to the carriage 16 through other types of components which are stiff in the axial direction but which permit slight transverse movement of the drive 22 between the spaced parallel racks to effectuate the self centering thereof.

Thus, there has been shown a machine having a carriage moved along a plurality of ways, which carriage is used to support tools of the machine, and which carriage is moved by a carriage drive that is permitted at least a limited "free-swinging" capability with respect to the carriage itself. The "free-swinging" carriage drive is more efficient and more accurate because it compensates for any irregularities in the worm racks that may be found in most any machine. The efficiency being improved because theoretically pure thrust of the worm gear is directed to the main carriage in view of the opposed worm racks on either side of the worm gear eliminating any bending moment generated between a worm gear and a single worm rack. Additionally, the improved carriage is permitted to use thinner operating oil films in hydrostatic worm drives, and in any case, a reduced worm screw, and simpler assembly.

It is intended that the appended claims be interpreted as exemplary only and not in a limiting sense.

Having thus described my invention, what I claim as new and desire to secure by Letters Patent of the United States is:

1. Apparatus for moving a carriage on a machine comprising a driven worm, a pair of worm racks arranged at opposite sides of the worm and extending generally parallel to the axis of rotation of the worm, a drive assembly mounting the worm for rotation to cause relative movement of the carriage and the racks, and means including a pivotal connection with the carriage mounting the assembly for limited movement to permit a swingable diametrical self-centering action of the worm between the racks.

2. Apparatus according to claim 1 in which the racks are fixed on the machine and the drive assembly is connected to the carriage by a universal joint which permits free swinging of the worm between the racks and provides movement of the carriage along the racks.

* * * * *